United States Patent
Zhao et al.

(10) Patent No.: US 11,465,252 B2
(45) Date of Patent: Oct. 11, 2022

(54) EXTERNAL COOLING MQL MANIPULATORS AND MACHINE TOOLS AND LUBRICATION METHOD USING MACHINE TOOLS

(71) Applicant: Sichuan University, Sichuan (CN)

(72) Inventors: Wu Zhao, Sichuan (CN); Zeyuan Yu, Sichuan (CN); Zida Zhang, Sichuan (CN); Ling Chen, Sichuan (CN); Xin Guo, Sichuan (CN); Miao Yu, Sichuan (CN); Kai Zhang, Sichuan (CN); Hao Wan, Sichuan (CN); Lin Du, Sichuan (CN); Wei Jiang, Sichuan (CN); Nianhan Wu, Sichuan (CN)

(73) Assignee: Sichuan University, Chengdu (CN)

( * ) Notice: Subject to any disclaimer, the term of this patent is extended or adjusted under 35 U.S.C. 154(b) by 364 days.

(21) Appl. No.: 16/693,207

(22) Filed: Nov. 22, 2019

(65) Prior Publication Data
US 2020/0230767 A1     Jul. 23, 2020

(51) Int. Cl.
*B23Q 11/10* (2006.01)
*B23Q 1/70* (2006.01)

(52) U.S. Cl.
CPC ...... *B23Q 11/1046* (2013.01); *B23Q 11/1076* (2013.01); *B23Q 1/70* (2013.01); *B23Q 11/1061* (2013.01); *B23Q 11/1069* (2013.01); *B23Q 11/1084* (2013.01)

(58) Field of Classification Search
CPC . B23Q 11/1038; B23Q 11/1046; B23Q 11/10; B23Q 11/1076; B23Q 11/1084; B23Q 11/122; B23Q 11/12; B05B 12/1454; B05B 13/0431
See application file for complete search history.

(56) References Cited

U.S. PATENT DOCUMENTS

2017/0326701 A1* 11/2017 Morimura .......... B23K 26/0093
2020/0039016 A1*  2/2020 Boelkins ............ B23Q 11/1046

FOREIGN PATENT DOCUMENTS

| CN | 101811269 A | 8/2010 | |
|---|---|---|---|
| CN | 204160259 U | 2/2015 | |
| CN | 105082125 A | 11/2015 | |
| CN | 106885122 A | 6/2017 | |
| WO | WO-2018127823 A1 * | 7/2018 | ............. B23Q 11/10 |

* cited by examiner

*Primary Examiner* — Boyer D Ashley
*Assistant Examiner* — Stephen Sun Cha (57) ABSTRACT

This application relates to lubrication, and more particularly to an external cooling MQL manipulator and a machine tool and a lubrication method using the machine tool. The external cooling MQL manipulator includes a suspension structure, a robot arm, a controller and an oil mist generator. The suspension structure fixedly connects the robot arm and a frame, and a nozzle is provided on a free end of the robot arm; an oil mist generator is connected to the nozzle for ejecting oil mists to a processing area. When the machine tool works, the controller selects the corresponding lubrication parameters according to the processing parameters such as the cutter type and the workpiece material. The first motor and the second motor are controlled to rotate by the controller according to real-time changes of the processing positions detected by the detecting component, thereby adjusting the position of the nozzle.

14 Claims, 5 Drawing Sheets

EXTERNAL COOLING MQL MANIPULATORS AND MACHINE TOOLS AND LUBRICATION METHOD USING MACHINE TOOLS

CROSS-REFERENCE TO RELATED APPLICATIONS

This application claims the benefit of priority from Chinese Patent Application No. 201910049758.7, filed on Jan. 18, 2019. The content of the aforementioned application, including any intervening amendments thereto, is incorporated herein by reference in its entirety.

TECHNICAL FIELD

This application relates to lubrication, and more particularly to external cooling MQL (minimum quantity lubrication) manipulators and machine tools and a lubrication method using machine tools.

BACKGROUND OF THE INVENTION

Commonly, MQL is an effective cooling and lubrication method in which compressed gases and trace amounts of lubricant are mixed to form oil mists containing micron droplets, and then the oil mists are ejected into cutting areas at a high speed via a nozzle to effectively cool and lubricate the cutting areas. Currently, in most commercially available external cooling MQL manipulators, positions of nozzles are adjusted manually and repeatedly when the length of the cutter changes, which is time-consuming.

Therefore, it is important to provide an external cooling MQL manipulator capable of automatically adjusting MQL parameters in real time for the process and manufacture using MQL cooling.

SUMMARY OF THE INVENTION

A first object of the invention is to provide an external cooling MQL manipulator, which is capable of adjusting lubrication positions in real time according to processing conditions.

A second object of the invention is to provide a machine tool, which employs the above-mentioned manipulator.

A third object of the invention is to provide an MQL method, which employs the above-mentioned machine tool and is capable of adjusting lubrication parameters in real time according to the processing conditions.

To achieve the above objects, the invention adopts the following technical solutions.

The invention provides an external cooling MQL manipulator, including:

a suspension structure;

a robot arm, which includes a connecting rod and an oil ejecting rod, where one end of the connecting rod is rotatably connected to the suspension structure, and the other end of the connecting rod is rotatably connected to the oil ejecting rod; a nozzle is provided on a free end of the oil ejecting rod;

a controller and a detecting component, where the controller is electrically connected to the first motor and the second motor; and the detecting component is electrically connected to the controller and is configured to detect the processing condition; and an oil mist generator, which is connected to the nozzle and configured to provide oil mists.

A first motor is provided on the suspension structure; the first motor is in transmission connection with the connecting rod and is configured to drive the connecting rod to rotate. A second motor is provided at a joint of the connecting rod and the oil ejecting rod, and is configured to drive the oil ejecting rod to rotate.

In some embodiments, the oil mist generator includes an air compressor, an oil tank, a pneumatic pump, and an oil and gas mixing valve, where the air compressor and the pneumatic pump are respectively connected to the oil and gas mixing valve; the pneumatic pump is connected to the oil tank; and the oil and gas mixing valve is connected to the nozzle.

In some embodiments, the oil mist generator further includes a solenoid valve and an air handler; and the solenoid valve and the air handler are provided at a pipeline which for connecting the air compressor and the oil and gas mixing valve.

In some embodiments, the connecting rod and the oil ejecting rod are hollow, where the pneumatic pump, the oil and gas mixing valve, the air handler and the solenoid valve are provided in the connecting rod; a pipeline for connecting the oil and gas mixing valve and the nozzle is provided in the oil ejecting rod.

In some embodiments, the connecting rod includes a first connecting rod and a second connecting rod, where one end of the first connecting rod is rotatably connected to the suspension structure, and the other end of the first connecting rod is rotatably connected to the second connecting rod; the second connecting rod is rotatably connected to the oil ejecting rod; and a third motor is provided at a joint of the first connecting rod and the second connecting rod; the third motor is electrically connected to the controller.

In some embodiments, a bearing is sheathed on the first connecting rod, and the first connecting rod is connected to the suspension structure via the bearing.

In some embodiments, the present invention further includes a shroud, which is connected to the suspension structure; and the controller and the first motor are provided in the shroud.

In some embodiments, the controller is a microcontroller or PLC.

The invention also provides a machine tool, including a spindle, a frame and the external cooling MQL manipulator, where the suspension structure is connected to the frame; the controller includes a storage unit, a reading unit and a control unit, and the storage unit and the reading unit are electrically connected to the control unit respectively.

The invention further provides a MQL method, which employs the machine tool and includes the following steps:

a) pre-storing lubrication scheme information in the storage unit; where the lubrication scheme information includes processing parameters and lubrication parameters corresponding to the processing parameters; the processing parameters include a cutter type, a spindle speed, a cutter material, a workpiece material, a machine temperature and a processing position; the lubrication parameters include a lubricant ejecting speed, a lubrication position, a flow rate, and an air pressure;

b) starting the spindle and the external cooling MQL manipulator, and adjusting the lubrication parameters by the external cooling MQL manipulator in real time according to changes of the processing parameters.

The invention has the following beneficial effects.

When the machine tool with the external cooling MQL manipulator operates, the spindle drives the workpiece to rotate, and the cutter carries out a feed motion. The controller selects corresponding lubrication parameters according to the processing parameters such as the cutter type and the workpiece material. The first motor and the second motor are controlled to rotate by the controller according to real-time changes of the processing positions detected by the detecting component, thereby adjusting the position of the nozzle. The machine tool enables the nozzle to effectively and constantly lubricate and cool the cutting area, thereby avoiding waste of the lubricant while stabilizing the quality of the workpiece.

The lubrication parameters of the external cooling MQL manipulator are adjusted in real time according to different working conditions using the above-mentioned lubrication method, thereby optimizing the lubrication scheme and maximizing the quality of the workpiece.

BRIEF DESCRIPTION OF THE DRAWINGS

The technical solutions of the embodiments of the present invention will be clearly described with reference to the accompanying drawings. It should be noted that the below drawings merely show a part of embodiments of the invention, and are not intended to limit the scope of the invention. Based on these accompanying drawings, other relative drawings can be obtained by those skilled in the art without any creative effort.

In the drawings, 1—spindle; 2—clamp; 3—control case; 4—suspension structure; 5—air compressor; 6—third motor; 7—oil tank; 8—connecting rod; 9—nozzle; 10—workbench; 11—workpiece; 12—cutter; 13—fixture; 14—controller; 15—shroud; 16—first motor; 17—connector; 18—bearing; 19—second motor; 20—oil and gas mixing valve; 21—pneumatic pump; 22—pneumatic valve; 23—solenoid valve; 24—air handler; 25—fixing plate.

DETAILED DESCRIPTION OF EMBODIMENTS

To make the objects, the technical solutions and the beneficial effects more clear, the technical solutions of the embodiments of the present invention will be clearly and completely described below with reference to the accompanying drawings. Obviously, described embodiments are merely a part of the embodiments of the invention. It should be noted that any other embodiments obtained by those skilled in the art based on the embodiments of the present invention without any creative effort should fall within the scope of the invention.

Therefore, the described embodiments of the invention are merely a part of the embodiments of the invention, and are not intended to limit the scope of the invention. All other embodiments obtained by those skilled in the art based on the embodiments of the invention without paying creative efforts are within the scope of the invention.

It should be understood that the directional terms used herein are based on the direction relationship shown in the drawings, and are merely for the convenience of the description of the invention, rather than indicating or implying a particular direction, or a construction and an operation in a particular direction of a device or a component, and thus such terms are not intended to limit the scope of the invention.

Unless specified, terms "mount", "link", "connect" and "fix" and the like used herein should be understood broadly. For example, "fix" may result in a fixed connection, a detachable connection, or an integrated configuration of elements. The elements may be connected mechanically or electrically; or directly connected or indirectly connected through an intermediate medium. Alternatively, two elements may be in communication or interact with each other unless specified. For the skilled in the art, the specific meanings of the above terms in the present invention can be understood according to specific conditions.

It should be stated that terms "middle", "above", "below", "left", "right", "vertical", "horizontal", "inside", "outside" and the like are based on the direction relationship shown in the drawings or the conventionally placed direction relationship of the invention, and are merely for the convenience of the description of the invention, rather than indicating or implying a particular direction, or a construction and an operation in a particular direction of a device or a component, and thus such terms are not intended to limit the invention. In addition, terms "first", "second", and the like in the invention are used for descriptive purposes only, and are not to be construed as indicating or implying relative importance thereof.

Moreover, terms "horizontal", "vertical", "pendulous" and the like do not require the component to be absolutely horizontal or pendulous, but may be slightly inclined. For example, the term "horizontal" simply means that the direction is horizontal in terms of "vertical", and does not mean that the structure must be completely horizontal, but may be slightly inclined.

Unless specified, the description that a first feature is above or below a second feature may includes a first situation that the first and the second feature are directly contacted, or a second situation that the first and the second feature are not directly contacted but contacted via an additional feature located therebetween. Besides, the description that the first feature is above the second feature may imply that the first feature is right above or obliquely above the second feature, or merely indicate that a level of the first feature is higher than that of the second feature. The description that the first feature is below the second feature may imply that the first feature is right below or obliquely below the second feature, or merely indicate that a level of the first feature is lower than that of the second feature.

Example 1

Figure 1:
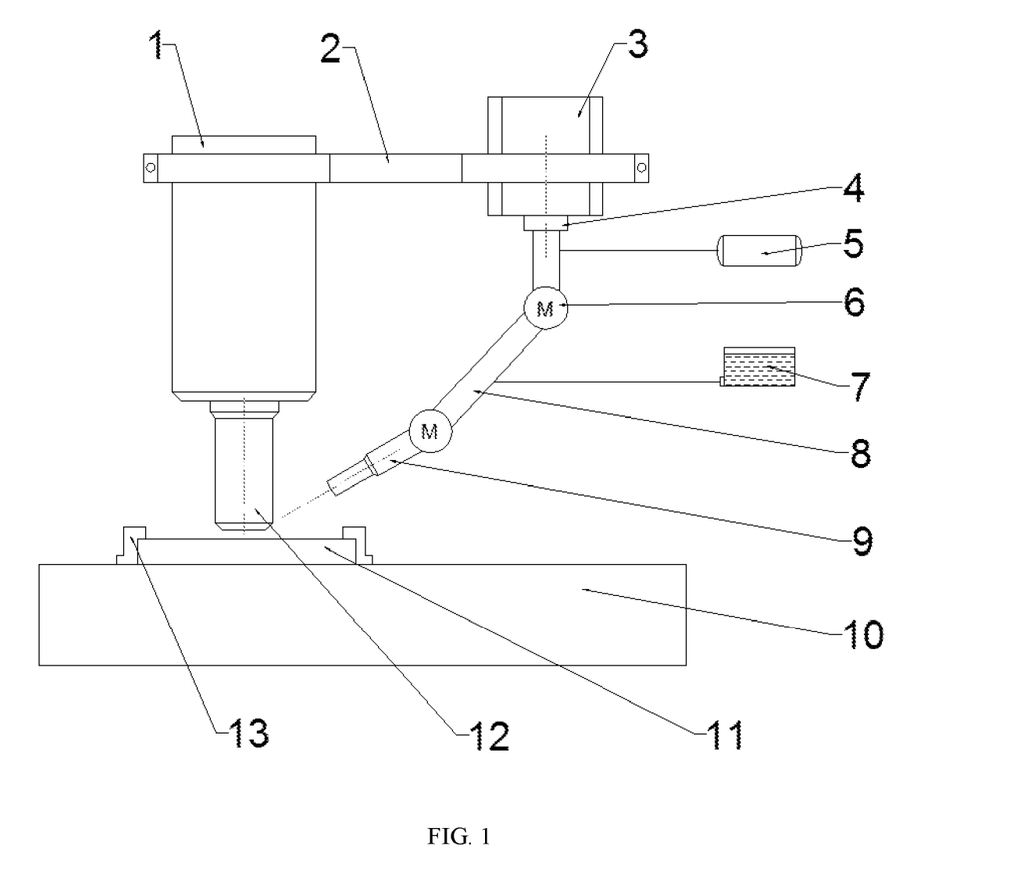
FIG. 1 is a schematic diagram of an external cooling MQL manipulator according to an embodiment of the invention.
Figure 2:
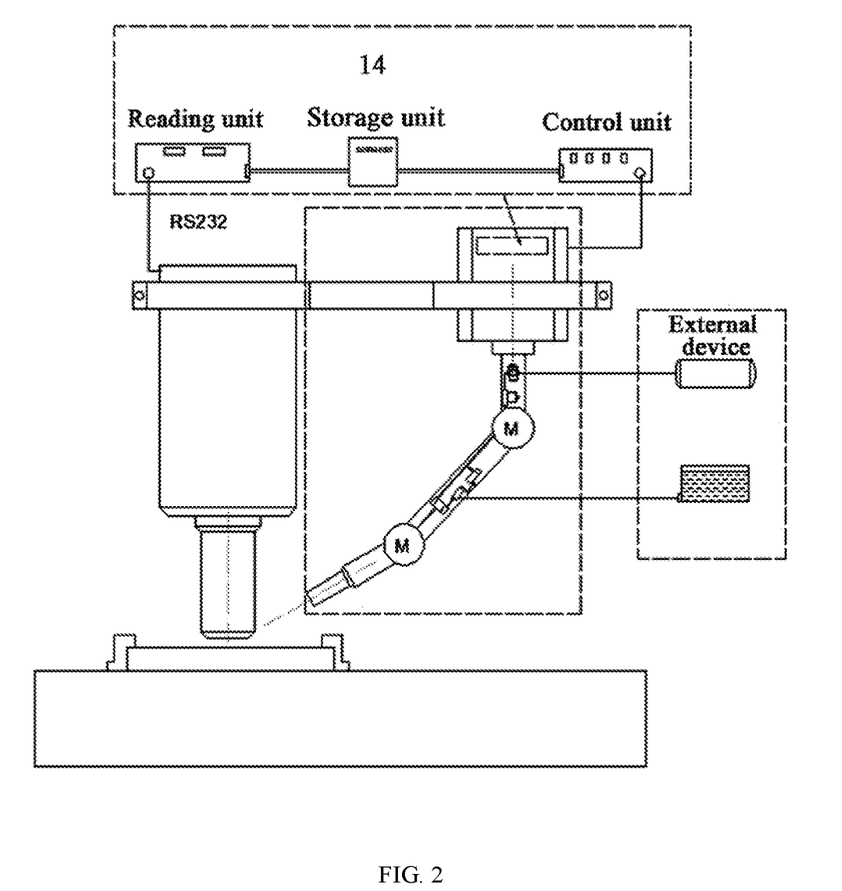
FIG. 2 schematically shows a controller and a robot arm of the external cooling MQL manipulator according to an embodiment of the invention.

As referring to FIGS. 1-2, provided is an external cooling MQL manipulator, which is mainly employed in a machine tool to lubricate a workpiece 11 when processing the workpiece 11 and to adjust a lubrication scheme in real time according to processing conditions. 10 is a workbench, and 13 is a fixture for fixing the workpiece 11. The external cooling MQL manipulator includes a suspension structure 4, a robot arm, a controller 14 and an oil mist generator, where the suspension structure 4 fixedly connects the robot arm to a frame, and a nozzle 9 is provided on a free end of the robot arm; the oil mist generator is connected to the nozzle 9, and the controller 14 is capable of controlling the movement of the robot arm to drive the nozzle 9 to spray oil mists to a processing area.

Specifically, as referring to FIGS. 1-6, the suspension structure 4 is a clamp-type connector, with one end connected to the frame and the other end providing a control case 3. The control case 3 includes a shroud 15, where the controller 14 is provided in the shroud 15. A mounting hole is provided at a lower portion of the shroud 15, and a bearing 18 for mounting the robot arm is provided in the mounting hole. A first motor 16 is further provided in the shroud 15 and is in transmission connection with the robot arm to drive the robot arm to rotate. Therefore, the first motor 16 and the controller 14 are assembled in the shroud 15, so that a compact structure is available and the controller 14 can be protected. A connector 17 is provided to connect the first motor 16 and the robot arm, and a fixing plate 25 is provided in the control case 3 to allow the first motor 16 to be fixed.

The robot arm includes a connecting rod 8 and an oil ejecting rod, where one end of the connecting rod 8 is rotatably connected to the suspension structure, and the other end of the connecting rod 8 is rotatably connected to the oil ejecting rod. A nozzle 9 is provided on a free end of the oil ejecting rod. An upper end of the connecting rod 8 is in transmission connection with the first motor 16 on the suspension structure 4. The first motor 16 is capable of driving the robot arm to rotate around a vertical axis of the robot arm, thereby driving the nozzle 9 to rotate in a horizontal plane. A second motor 19 is provided at a joint of the oil ejecting rod and the connecting rod 8 and is configured to drive the oil ejecting rod to rotate in a vertical plane to change a level of the nozzle 9.

Further, to increase an adjusting range of a height of the nozzle, the connecting rod 8 includes a first connecting rod and a second connecting rod which are hinged together. An upper end of the first connecting rod is connected to the suspension structure 4, and a lower end of the first connecting rod is connected to the second connecting rod. A third motor 6 is provided at a joint of the first connecting rod and the second connecting rod. The third motor 6 drive the second connecting rod to rotate in a vertical plane to drive the oil ejecting rod to move, so that a level of the nozzle 9 changes accordingly when a height of the workpiece 11 changes.

The oil mist generator includes an air compressor 5, an oil tank 7, a pneumatic pump 21, a solenoid valve 23, an air handler 24 and an oil and gas mixing valve 20. The air compressor 5 is directly connected to the air handler 24. The compressed air from the air compressor 5 is treated in the air handler 24 and then flows into the solenoid valve 23 by passing through an air throttle. The solenoid valve 23 is connected to the oil and gas mixing valve 20. The oil tank 7 is connected to the pneumatic pump 21 via a hose. The pneumatic pump 21 pumps a lubricant from the oil tank 7 to the oil and gas mixing valve 20 through a connecting pipe. The lubricant and the compressed air are mixed in the oil and gas mixing valve 20 to generate oil mists, and are ejected via the nozzle 9 under the action of the compressed air. The air handler 24 is mainly used to remove moisture in the compressed air to reduce the moisture content of the oil mist, thereby improving the lubrication effect. The solenoid valve 23 is employed to control the feeding of the compressed air.

Figure 3:
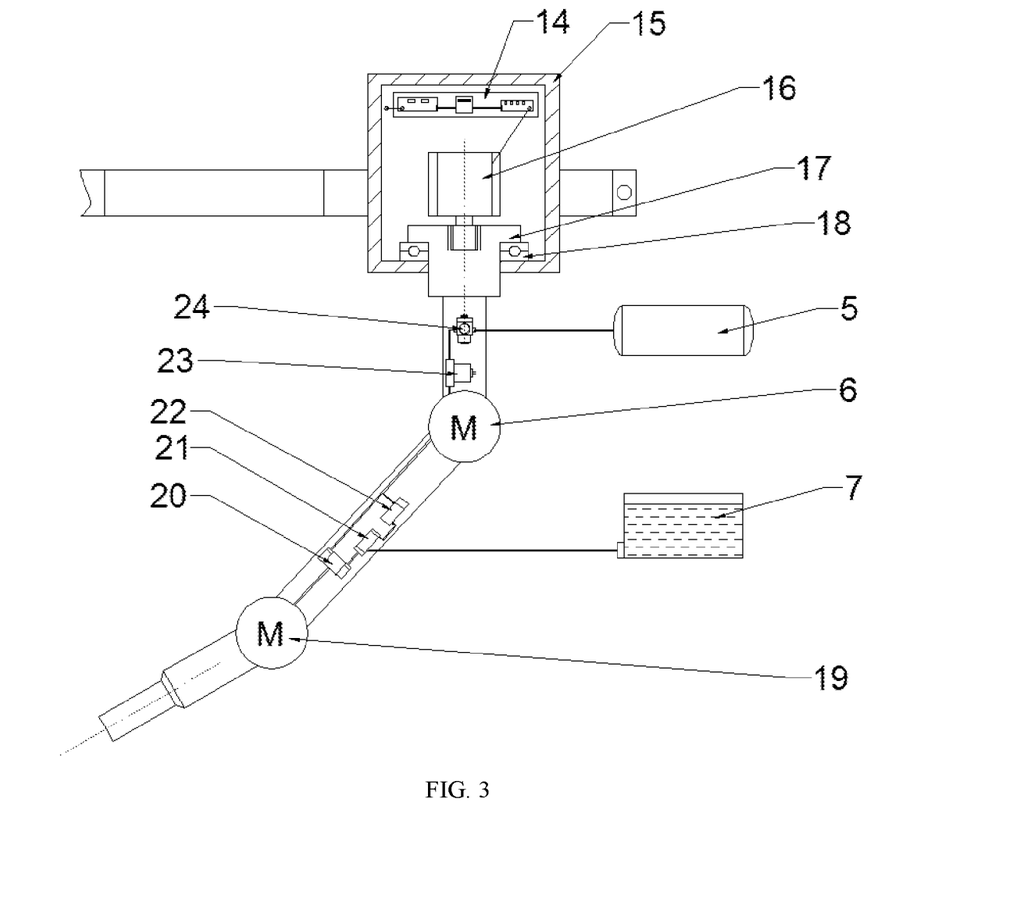
FIG. 3 schematically shows an inner structure of the external cooling MQL manipulator according to an embodiment of the invention.
Figure 4:
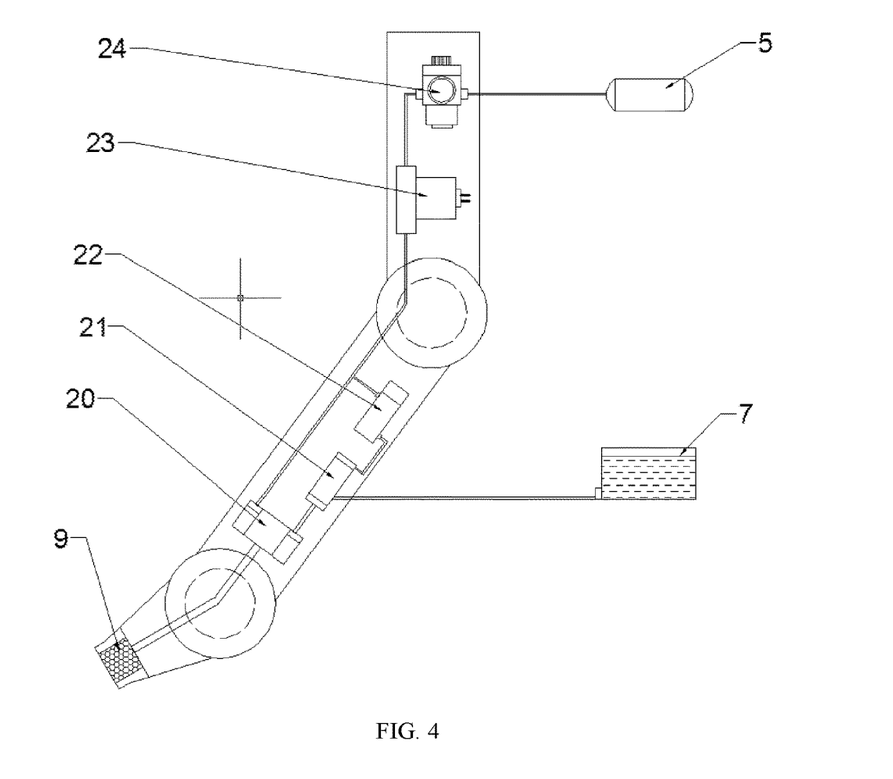
FIG. 4 schematically shows an inner structure of the robot arm according to an embodiment of the invention.
Figure 5:
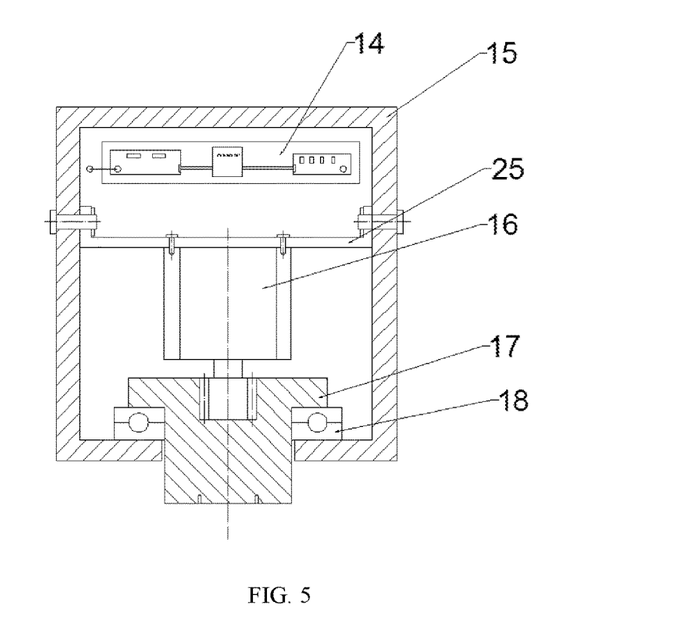
FIG. 5 is a schematic diagram of a control case according to an embodiment of the invention.

Further, the connecting rod 8 and the oil ejecting rod are hollow, where the pneumatic pump 21, the oil and gas mixing valve 20, the air handler 24 and the solenoid valve 23 are provided in the connecting rod 8; a pipeline for connecting the oil and gas mixing valve 20 and the nozzle 9 is provided in the oil ejecting rod. Such design gathers most pipelines and corresponding components of the oil mist generator in the robot arm, enabling a compact structure. Moreover, the pipelines and components are avoided to be damaged when the robot arm moves, improving the reliability of the device.

In this embodiment, the controller 14 is a PLC, and an RS232 interface is adopted to connect the spindle 1. The detecting component includes a position sensor and a speed sensor. The position sensor monitors the cutting position of the cutter 12 in real time, and the speed sensor monitors the rotate speed of the spindle 1 in real time. The controller 14 controls the oil mist generator to provide corresponding oil mists according to the data from the detecting component.

The working principle of the external cooling MQL manipulator is described as follows.

Figure 6:
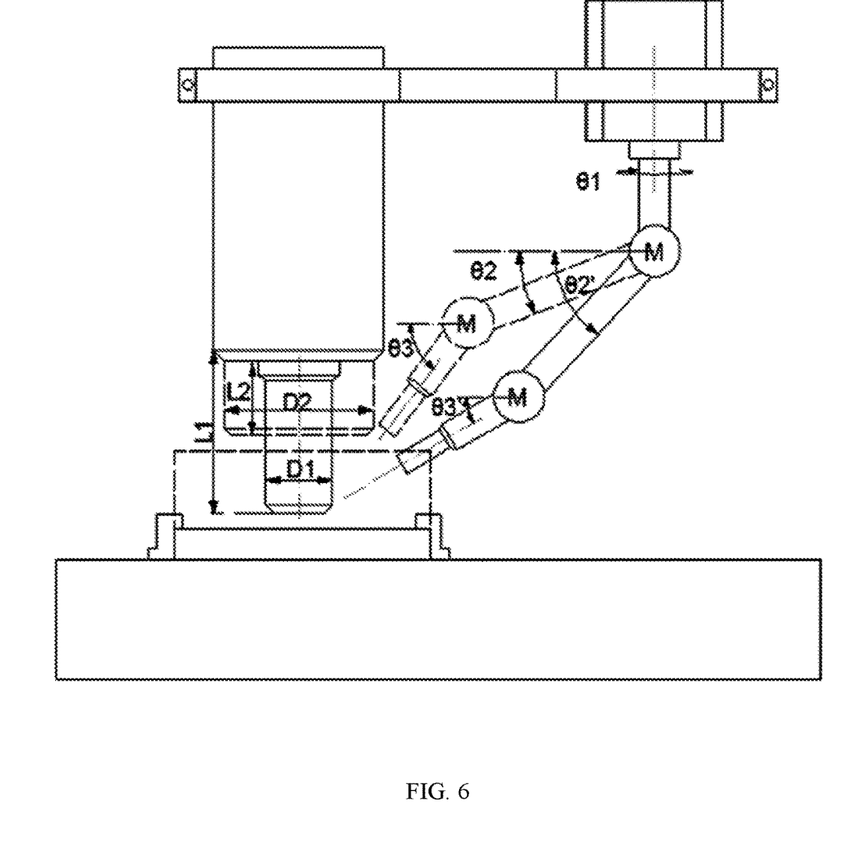
FIG. 6 schematically shows rotation angles of first, second and third motors according to an embodiment of the invention.

The rotation angles of the first, second and third motors of the external cooling MQL manipulator are $\theta1$, $\theta2$ and $\theta3$, respectively. When the controller 14 reads changes of the cutter 12 of the machine tool, for example, a first cutter 12 with a length of L1 and a diameter of D1 is changed to a second cutter 12 with a length of L2 and a diameter of D2, the system selects the preset and optimal position scheme of the nozzle 9 corresponding to the second cutter 12, and then the rotation angles are changed to $\theta1'$, $\theta2'$ and $\theta3'$ by the rotation of the first motor 16, the second motor 19 and the third motor 6 to reach the optimal position.

Figure 7:
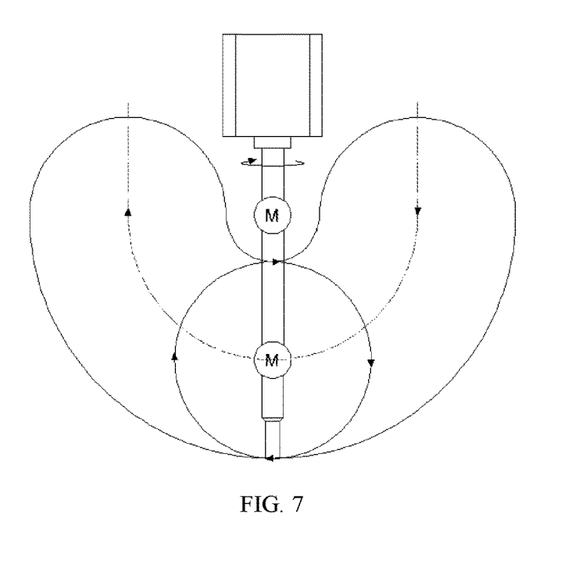
FIG. 7 schematically shows changeable spatial positions of a nozzle according to an embodiment of the invention.

As shown in FIG. 7, the first motor 16 is capable of rotating 360° in a horizontal direction, and the second motor 19 is capable of rotating 180° in a vertical direction, and the third motor 6 is capable of driving the nozzle 9 to rotate near 360° in a vertical direction.

The lubricant device in this embodiment has the following beneficial effects.

The conventional MQL methods cannot adjust the MQL parameters (the flow quantity, the flow rate, the air pressure, the ejecting angle, the target distance, etc.) in real time. However, the processing conditions often constantly change. For example, different cutting depths require different lubricants, and the temperature of the cutter increases or the lubricant is wasted when the lubricant is not adjusted. If the ejection of the lubricant is blocked after the cutter 12 is changed, the lubricant cannot be ejected to the processing area, thereby failing to lubricate and cool the processing area. Therefore, external cooling MQL manipulators which cannot be adjusted causes a poor lubrication and cooling effect on the processing area, thereby resulting in unstable processing qualities and even scrapping of the workpiece 11 in severe cases. However, the external cooling MQL manipulator of this embodiment is capable of adjusting the lubrication scheme in real time according to real-time changes of processing conditions, avoiding a waste of the lubricant and improving the lubrication and cooling effects. Moreover, the quality of the workpiece 11 is stabilized.

Example 2

This embodiment provides a machine tool and a lubrication method using the machine tool. The machine tool includes a spindle 1, a frame and the external cooling MQL manipulator of Example 1, where the suspension structure 4 is connected to the frame; the controller 14 includes a storage unit, a reading unit and a control unit, and the storage unit and the reading unit are electrically connected to the control unit respectively. A clamp 2 is provided between the spindle 1 and the external cooling MQL manipulator.

The lubrication method is carried out by employing the machine tool and includes the following steps:

a) pre-storing lubrication scheme information in the storage unit; where the lubrication scheme information includes processing parameters and lubrication parameters corresponding to the processing parameters; the processing parameters include a type of the cutter 12, a speed of the spindle 1, a material of the cutter 12, a material of the workpiece 11, a machine temperature and a processing position; the lubrication parameters include a lubricant ejecting speed, a lubrication position, a flow rate, and an air pressure;

b) starting the spindle 1 and the external cooling MQL manipulator, and adjusting the lubrication parameters by the external cooling MQL manipulator in real time according to changes of the processing parameters.

The above is only some preferred embodiments of the present invention, and is not intended to limit the scope of the invention. Variants and modifications may be made by those skilled in the art, and any modifications, equivalent substitutions and improvements within the spirit and principle of the present invention shall fall into the scope of the present invention.

What is claimed is:

1. An external cooling MQL manipulator, comprising:
a suspension structure;
a robot arm, comprising a connecting rod and an oil ejecting rod, wherein the connecting rod and the oil ejecting rod are hollow; one end of the connecting rod is rotatably connected to the suspension structure, and the other end of the connecting rod is rotatably connected to the oil ejecting rod; a nozzle is provided on a free end of the oil ejecting rod;
a controller and a detecting component, the controller is electrically connected to a first motor and a second motor; and the detecting component is electrically connected to the controller and is configured to detect a processing condition; and
an oil mist generator configured to provide oil mists and comprising an air compressor, an oil tank, a pneumatic pump, an oil and gas mixing valve, a solenoid valve and an air handler;
wherein the pneumatic pump, the oil and gas mixing valve, the air handler and the solenoid valve are provided in the connecting rod; wherein the solenoid valve is configured to control a feeding of a compressed air; and the air handler is configured to remove moisture in the compressed air to reduce a moisture content of the oil mists;
a pipeline for connecting the oil and gas mixing valve and the nozzle is provided in the oil ejecting rod;
the solenoid valve and the air handler are provided on a pipeline which is for connecting the air compressor and the oil and gas mixing valve;
the oil tank is connected to the pneumatic pump, and the pneumatic pump is connected to the oil and gas mixing valve;
the oil and gas mixing valve is connected to the nozzle;
wherein the first motor is provided on the suspension structure; the first motor is in transmission connection with the connecting rod and is configured to drive the connecting rod to rotate; the second motor is provided at a joint between the connecting rod and the oil ejecting rod and is configured to drive the oil ejecting rod to rotate.

2. The external cooling MQL manipulator of claim 1, wherein
the connecting rod comprises a first connecting rod and a second connecting rod; one end of the first connecting rod is rotatably connected to the suspension structure, and the other end of the first connecting rod is rotatably connected to the second connecting rod; the second connecting rod is rotatably connected to the oil ejecting rod; and
a third motor is provided at a joint between the first connecting rod and the second connecting rod; the third motor is electrically connected to the controller.

3. The external cooling MQL manipulator of claim 2, wherein a bearing is sheathed on the first connecting rod, and the first connecting rod is connected to the suspension structure via the bearing.

4. The external cooling MQL manipulator of claim 1, further comprising a shroud, wherein the shroud is connected to the suspension structure; and the controller and the first motor are provided in the shroud.

5. The external cooling MQL manipulator of claim 1, wherein the controller is a microcontroller or PLC.

6. A machine tool, comprising: a spindle, a frame and the external cooling MQL manipulator of claim 1;
wherein the suspension structure is connected to the frame; the controller comprises a storage unit, a reading unit and a control unit, and the storage unit and the reading unit are electrically connected to the control unit, respectively.

7. The machine tool of claim 6, wherein the oil mist generator comprises an air compressor, an oil tank, a pneumatic pump, and an oil and gas mixing valve; the air compressor and the pneumatic pump are respectively connected to the oil and gas mixing valve; the pneumatic pump is connected to the oil tank; and
the oil and gas mixing valve is connected to the nozzle.

8. The machine tool of claim 7, wherein the oil mist generator further comprises a solenoid valve and an air handler; and
the solenoid valve and the air handler are provided on a pipeline which is for connecting the air compressor and the oil and gas mixing valve.

9. The machine tool of claim 6, wherein the connecting rod and the oil ejecting rod are hollow; the pneumatic pump, the oil and gas mixing valve, the air handler and the solenoid valve are provided in the connecting rod; a pipeline for connecting the oil and gas mixing valve and the nozzle is provided in the oil ejecting rod.

10. The machine tool of claim 6, wherein the connecting rod comprises a first connecting rod and a second connecting rod; one end of the first connecting rod is rotatably connected to the suspension structure, and the other end of the first connecting rod is rotatably connected to the second connecting rod; the second connecting rod is rotatably connected to the oil ejecting rod; and
a third motor is provided at a joint between the first connecting rod and the second connecting rod; the third motor is electrically connected to the controller.

11. The machine tool of claim 10, wherein a bearing is sheathed on the first connecting rod, and the first connecting rod is connected to the suspension structure via the bearing.

12. The machine tool of claim 6, wherein the external cooling MQL manipulator further comprises a shroud; the shroud is connected to the suspension structure; and the controller and the first motor are provided in the shroud.

13. The machine tool of claim 6, wherein the controller is a microcontroller or PLC.

14. An MQL method using the machine tool of claim 6, comprising:
   a) pre-storing lubrication scheme information in the storage unit; wherein the lubrication scheme information comprises processing parameters and lubrication parameters corresponding to the processing parameters; the processing parameters comprise a cutter type, a spindle speed, a cutter material, a workpiece material, a machine temperature and a processing position; the lubrication parameters comprise a lubricant ejecting speed, a lubrication position, a flow rate, and an air pressure;
   b) starting the spindle and the external cooling MQL manipulator; and adjusting the lubrication parameters by the external cooling MQL manipulator in real time according to changes of the processing parameters.

* * * * *